March 29, 1932. J. D. SMITH 1,851,929
ACCELERATOR ATTACHMENT FOR MOTOR VEHICLES
Filed May 12, 1930
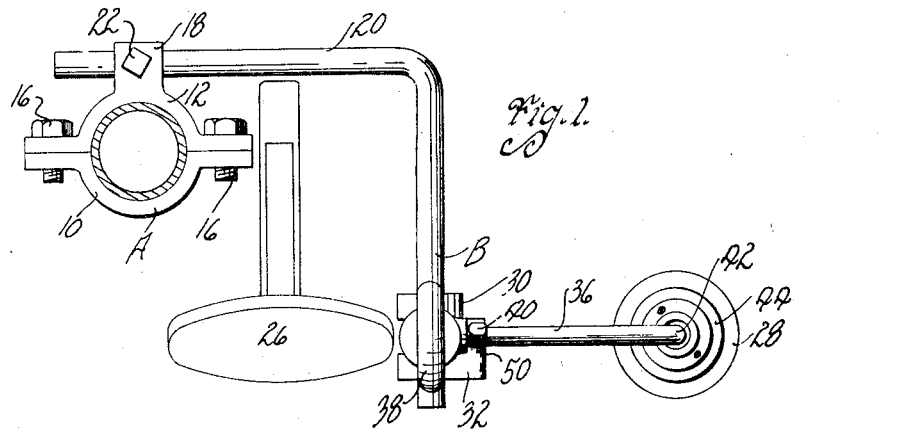
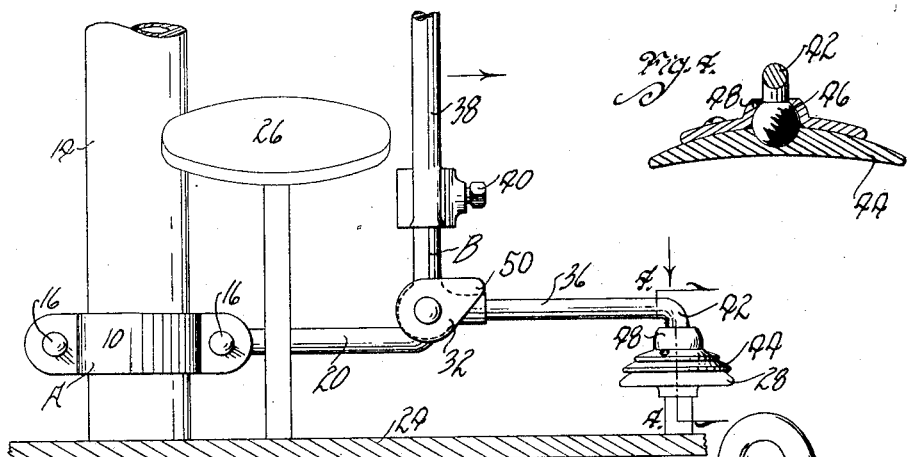
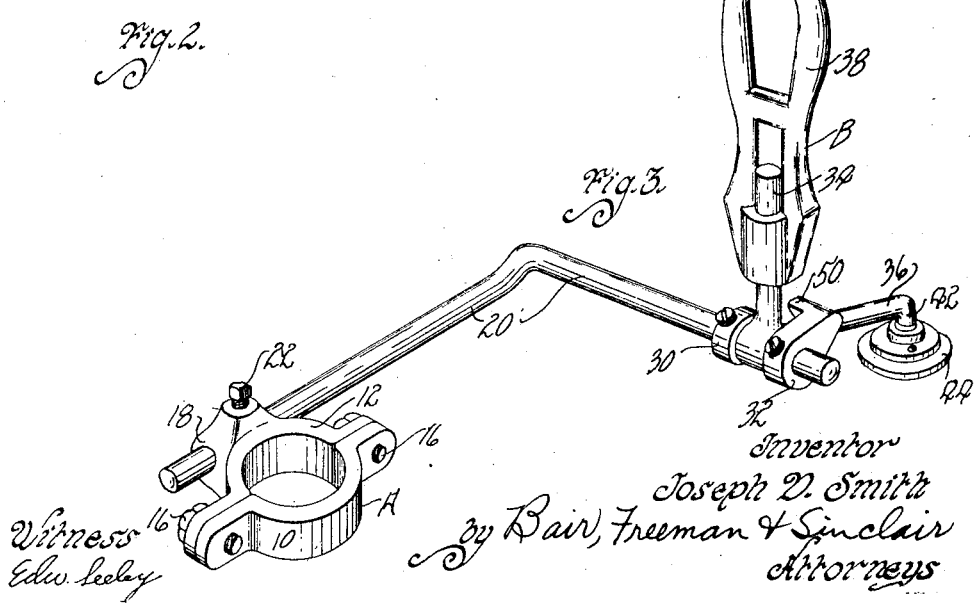
Inventor
Joseph D. Smith
By Bair, Freeman & Sinclair
Attorneys
Witness
Edw. Seeley Patented Mar. 29, 1932

1,851,929

UNITED STATES PATENT OFFICE

JOSEPH D. SMITH, OF MARSHALLTOWN, IOWA, ASSIGNOR OF ONE-HALF TO CHARLES E. SMITH, OF MARSHALLTOWN, IOWA

ACCELERATOR ATTACHMENT FOR MOTOR VEHICLES

Application filed May 12, 1930. Serial No. 451,651.

An object of my invention is to provide an accelerator attacment for motor vehicles particularly designed to facilitate operation, for instance at such times as when the vehicle is being driven through heavy traffic, requiring frequent slowing up, stopping and starting.

A further object of the invention is to provide an improved attachment for motor vehicles including means located adjacent the service brake pedal to permit operation of the accelerator without the necessity of removing the foot from the brake pedal.

Still another object is to provide an attachment of the character described, which is capable of being adjusted to suit a variety of makes and sizes of motor vehicles.

Another and further object of the invention is to provide an attachment of the character described, which is simple and inexpensive of construction, and capable of being easily and quickly installed for use.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:—

Figure 1 is a plan view illustrating my improved attachment mounted in position for use.

Figure 2 is a rear elevation of the same.

Figure 3 is a perspective view of the attachment dismounted relative to the vehicle.

Figure 4 is a detail section on the line 4—4 of Figure 2, illustrating a method of universally mounting the plate, which is designed to contact with the accelerator element.

The embodiment of my invention which is herein shown and about to be described, is capable of being easily and quickly mounted for use without the removal of any of the parts of the ordinary motor vehicle and without the necessity of drilling holes or making other alterations in any of the parts of the vehicle. It is also provided with ample means for adjusting the relative positions of the various parts to adapt the device for use with many different sizes and styles of vehicles.

A clamping device A is composed of two coacting parts 10 and 12 adapted to embrace the lower portion of the steering column 14 of a motor vehicle and to be held in assembled relation by means of bolts or screws 16.

The clamp member 12 is formed with a laterally directed lug or boss 18, which is transversely apertured to receive one arm of a substantially L shaped bracket 20. The bracket 20 is preferably formed of a length of steel or other suitable metallic rod. It is slidably adjustable in the lug or boss 18 and held in the desired position of adjustment by means of a set screw 22.

The L shaped bracket extends laterally to the right from the location of the steering column 14 and then rearwardly in a position slightly above the inclined floor board 24 of the vehicle. The rearwardly directed part of the bracket 20 extends between the brake pedal 26 and an accelerator pedal or operating element 28, which is usually provided and adapted for foot actuation to accelerate the speed of the motor by downward pressure of the foot thereon. The bracket 20 preferably is slightly offset upwardly between its ends to bring its rear portion to the desired elevation relative to the top of the accelerator element 28.

Pivotally mounted on the rearwardly extending portion of the L shaped bracket 20 is an actuating member designated by the character B.

The actuating element B is located substantially on a line between the brake pedal 26 and accelerator element 28 and is loosely confined on the bracket 20 between a pair of set collars 30 and 32.

The actuating element B is of substantially bell crank form and it includes an upwardly directed member 34 and a substantially horizontal member 36 extending laterally toward the accelerator element 28.

A foot engaging member 38 is adjustably mounted on the post 34 of the actuating element and is adapted to be set and held in the desired position by means of a set screw 40. The foot engaging element 38 is arranged in an upright position on the right hand side of and spaced slightly from the brake pedal 26 so that the driver, by moving his foot a slight distance toward the right, may engage said element without removing the foot from said brake pedal.

The laterally projecting portion 36 of the actuating element may engage in any desired manner the accelerator element 28 so that when the actuating element is oscillated in the direction indicated by the arrows in Figure 2, the element 28 will be depressed for accelerating the motor.

As here shown, the portion 36 is extended downwardly as a hanger 42 having at its lower end ball-and-socket or universal connection with an accelerator plate 44. This pivotal connection may be composed of a spherical portion 46 on the end of the hanger member 42 engaging in a socket member 48 formed on or fixed to the plate 44.

The accelerator plate 44 overlies and is adapted to engage the head of the accelerator element 28. The universal pivotal connection of the plate 44 to its support permits the plate to conform to the position of the accelerator element and provide a proper engagement at all times.

The set collar 32 which is here shown as mounted at the lower side of the actuating element B is extended laterally from the bracket 20 and is formed with a right angled projection 50 which extends over the horizontal portion 36 of said element. The lug 50 acts as a stop to limit upward movement of the member 36, or in other words, to limit oscillation of the actuating element B in a direction opposite to that indicated by the arrows in Figure 2.

The spring which is usually associated with the accelerator element 28 and which is not shown in the drawings serves to hold said element upwardly toward and against the plate 44 and to cause the horizontal portion 36 to be normally in contact with the stop lug 50.

In practical use the attachment is mounted as shown and described, and is adjusted to the required position relative to the brake pedal 26 and accelerator element 28.

It will be noted that the clamping device A provides a convenient means for easily and quickly installing the attachment and holding it rigidly in place.

The bracket 20 may be adjusted laterally to the desired position by loosening the set screw 22 and sliding the bracket in the apertured lug 18. In this way the rearwardly extending portion of the bracket carrying the actuating member may be positioned in the desired location and spaced the proper distance from the brake pedal.

The actuating element B may be adjusted forwardly or rearwardly on the rearwardly extending portion of the bracket 20 by adjusting the positions of the set collars 30 and 32 and in this manner the actuating element may be positioned directly opposite the brake pedal 26.

The foot engaging member 38 may be adjusted vertically by means of the set screw 40 so that it will project the desired distance above the normal level of the brake pedal.

The device is particularly useful at times when a vehicle is being driven through congested traffic thereby requiring frequent changes of speed, and alternate stopping and starting of the vehicle.

At such times the driver may keep his foot on the brake pedal 26 so that the brake may be instantly applied when occasion may require it. As soon as pressure on the brake is released he may cause an acceleration of the motor by a slight sidewise movement of the foot, which still remains upon or above the brake pedal. This sidewise movement causes an engagement with the member 38, thus rocking the actuating element B to the right and causing a downward pressure, through the bell crank lever 34—36, on the accelerator element 28.

When the pressure on the foot engaging member 38 is released, the spring of the accelerator element causes it to be raised again in the ordinary manner and the accelerator element pushes upwardly on the actuating device and rocks it to the left until it engages the stop lug 50 of the set collar 32.

By the use of this device I have provided a simple and inexpensive means which greatly facilitates the alternate slowing up and acceleration of the vehicle, with the minimum of effort on the part of the driver, and with a consequent increase of safety.

Under normal driving conditions the operator may if he desires place his foot on the horizontal portion 36 of the actuating element and employ it as a foot rest for convenience in operating the accelerator element in the ordinary manner.

It is to be understood that the form and shape of the device may be varied and modified in many particulars and that the specific means for providing an engagement with the accelerator element is not essential to the successful operation of the device.

I claim as my invention:—

1. An accelerator attachment for motor vehicles having a brake pedal and an accelerator operating element spaced laterally therefrom, comprising a support, and a bell-crank actuating device pivotally mounted on said support, a member on said support adjacent said actuating device, said actuating device having an upstanding portion located adjacent the brake pedal and a laterally extending portion adapted to engage the accelerator element, whereby the accelerator element may be actuated by lateral pressure on said upstanding portion, said member being formed with a stop lug overlying the laterally extending portion of the actuating device for limiting its movement in one direction.

2. An accelerator attachment for motor vehicles having a brake pedal and an accelerator operating element spaced laterally therefrom, comprising a support, and a bell-crank actuating device pivotally mounted on said support, a pair of set collars adjustably mounted on said support on opposite sides of said actuating device, whereby the position of the latter member may be adjusted longitudinally of the support, said actuating device having an upstanding portion located adjacent the brake pedal and a laterally extending portion adapted to engage the accelerator element, whereby the accelerator element may be actuated by lateral pressure on said upstanding portion, one of said set collars being formed with a stop lug overlying the laterally extending portion of the actuating device for limiting its movement in one direction.

3. An accelerator attachment for motor vehicles having a steering column, comprising a clamping device adapted to be mounted on said steering column and formed with a projecting apertured lug, an L shaped support having a portion extending through and adjustably anchored in said lug, and having another portion extending between the brake pedal and accelerator element of the vehicle, and a bell-crank actuating device pivotally mounted on said support and having a part adapted to engage the accelerator element.

Des Moines, Iowa, May 2, 1930.

JOSEPH D. SMITH.